Figure 1:
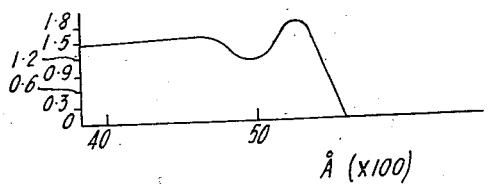

March 4, 1958

G. N. WHITE 2,825,731

PROCESS OF REACTING DIOXANE OR PIPERAZINE
WITH CERTAIN ACTIVE METHYL-SUBSTITUTED
QUATERNIZED HETEROCYCLIC BASES

Filed June 21, 1955

Inventor

GERALD NOEL WHITE

By Bacon + Thomas

Attorneys

United States Patent Office 2,825,731
Patented Mar. 4, 1958

2,825,731

PROCESS OF REACTING DIOXANE OR PIPERAZINE WITH CERTAIN ACTIVE METHYL-SUBSTITUTED QUATERNIZED HETEROCYCLIC BASES

Gerald Noel White, Carshalton, England, assignor to Photo-Chemical Company Limited, London, England, a British company Application June 21, 1955, Serial No. 518,894

Claims priority, application Great Britain June 25, 1954

8 Claims. (Cl. 260—298)

This invention is concerned with improvements in or relating to photographic sensitizers for use in the production of silver halide emulsions for photography.

Many sensitizers for silver halide emulsions are known which contain as essential features of their molecular structure two heterocyclic residues linked together by a carbon chain through conjugated methine groups contained in the heterocyclic residues, each heterocyclic residue containing a tertiary nitrogen atom adjacent or in the para position to a methylene substituted methine group, one of the tertiary nitrogen atoms being quaternized and the methylene substituents forming the terminal groups of the carbon chain. Such sensitizers are prepared by the quaternization of compounds containing heterocyclic rings of the above type, that is rings containing a tertiary nitrogen atom adjacent or in the para position to a methyl substituted methine group, followed by condensation with a suitable derivative of the residue which is to form the carbon chain. On quaternization this tertiary nitrogen atom becomes positively charged and the electron displacement taking place towards it weakens the attraction between the carbon and hydrogen atoms of the methyl group. The result of quaternization, therefore, is to make this methyl group no longer a reacting entity but liable instead to undergo proton release in the presence of any reagent that is proton accepting.

Hitherto such sensitizers have been prepared by condensing a quaternized heterocyclic compound of the above type with a carbon chain compound carrying terminal groups capable of being eliminated, on proton acceptance, as water, hydrogen sulphide, mercaptans, aryl primary bases or alcohols, the choice of compound that provides the carbon chain being dependent on whether the two heterocyclic residues to be linked are similar or dissimilar or whether the carbon chain that links them is to be long or short, linear or branched.

A disadvantage of many of the sensitizers of this type previously proposed has been that the carbon chain compounds used for the condensation have themselves been difficult to prepare and expensive.

I have now developed a novel range of photographic sensitizers having valuable sensitization characteristics in which the compounds used in the condensation to link the two heterocyclic residues are in general both cheap and readily available.

In order to facilitate recognition of my new compounds, I now give the optical characteristics of six compounds according to the invention, the preparation of which will be described hereinafter. The optical characteristics are shown in the accompanying drawing in which the six figures show curves obtained by plotting density, that is the logarithm of the reciprocal transmission (ratio of transmitted light to incident light) as ordinates against the wavelength of the incident light as abscissae, for each of the six compounds in question. In all cases the curves were obtained using a concentration of 1 mg. of sensitizer per 100 ccs. of photographic emulsion; the units of wavelength are hundreds of Angstrom units.

In common with many other quaternary salts, the compounds of the present invention decompose at high temperatures, the actual temperature of decomposition in any given case depending on the rate of heating, crystal size, etc.; a temperature of decomposition for a particular compound is therefore to a large extent irreproducible. In these circumstances a statement of the temperatures of decomposition of the compounds is virtually worthless and will not be given in the examples to be set forth hereinafter.

I have further found that the new sensitizers can be prepared by quaternizing a suitable heterocyclic compound and condensing the quaternary salt obtained with an alicyclic diether or an alicyclic di-imine.

According to a feature of the present invention, therefore, I provide a process for the preparation of the new sensitizers, in which a quaternized heterocyclic base containing nitrogen in the ring and a methyl substituted methine group adjacent or in the para position to the nitrogen atom of the base is condensed with an alicyclic diether or an alicyclic di-imine.

The quaternized base to be used in the process according to the invention is preferably a quaternary salt of the general formula

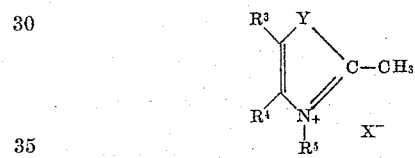

where $R^3$, and $R^4$, which may be the same or different, are alkyl, aryl or aralkyl groups or together form part of a hydrocarbon ring, which itself may be substituted or unsubstituted; $R^5$ is an alkyl group; Y is an oxygen, sulphur or selenium atom or a substituted or unsubstituted methylene or imino group and $X^-$ is an anion.

It is preferred that $R^3$ and $R^4$ together form part of a substituted or unsubstituted benzene ring, preferred substituents in the benzene ring being alkyl, aryl, aralkyl and alkoxy groups and halogen atoms; $R^5$ is an ethyl group; Y is an oxygen or sulphur atom, and $X^-$ is a chloride, bromide, iodide, thiocyanate perchlorate, nitrate or sulphate ion. The condensation is preferably carried out in the presence of a dehydrating agent and/or an acid binding agent.

A suitable alicyclic diether for use in the process according to the invention is, for example, dioxan and a suitable alicyclic di-imine is, for example, piperazine.

The condensation reaction is, in general, slow and is advantageously carried out at elevated temperatures, for example, at the boiling point of the reaction mixture. Even at elevated temperatures the reaction may take several hours, or in certain cases even two to three days, to reach a maximal yield which can, in general, only be determined by trial and error, that is trial reactions should be carried out using a particular set of reaction conditions and the optimum time for the reaction being determined by finding the time required to give the maximum yield.

Suitable dehydrating agents for use in the process according to the invention are, for example, aliphatic acid anhydrides, such as acetic anhydride and propionic anhydride. Tertiary amines, such for example as pyridine, collidine and isoquinoline, are suitable acid binding agents for use in the condensation reaction. In general it may be said that reaction conditions applicable to condensation reactions in general are equally applicable to the condensation reaction according to the invention, and therefore that suitable dehydrating agents, acid binding agents, temperatures of reaction and other reaction conditions will be apparent to those skilled in the art.

The proportions of the various reactants and the conditions of the condensation should therefore be adjusted to suit the properties of the sensitizer obtained and the kinetics of its production. For example the proportions of alicyclic diether or alicyclic di-imine, tertiary base and aliphatic acid anhydride required will vary from one heterocyclic quaternary salt to another. The dehydrating agent, for example an aliphatic acid anhydride, may for instance be omitted entirely with advantage in the case of benzselenazolium salts, and the proportion of acid binding agent, such as pyridine, to alicyclic diether, such as dioxan, may in this case and in the case of some thiazolium salts be lowered with advantage to the extend of causing the reaction mixture to separate into two liquid phases.

In the following examples, given by way of illustration only, the quaternary ammonium alkyl sulphate starting material was prepared in each case by reacting the appropriate tertiary base with an excess of alkyl sulphate; the crude reaction product so obtained and containing unreacted alkyl sulphate was used as such in the subsequent reaction:

*Example 1*

63 gms. of 2:4:5-trimethylbenzoxazolium ethyl sulphate are dissolved by warming in a mixture of 12 ccs. of pure dry pyridine, 30 ccs. of propionic anhydride, and 35 ccs. of pure dioxan. After standing for 3 hours, the solution is boiled under reflux for 2½ hours before being poured into 400 ccs. of ethanol. An equal volume of 20% aqueous ammonium thiocyanate is added with stirring. After allowing the mixture to stand several hours, the liquors are decanted and the residue worked up with ether till granular. The product which consists of an orange red powder is recrystallized from 400 ccs. of methylacetoacetate. A yield of 13.5 gms. of sensitizer in the form of a light scarlet crystalline powder is obtained. Optical characteristics: see Fig. 1.

*Example 2*

Figure 2:
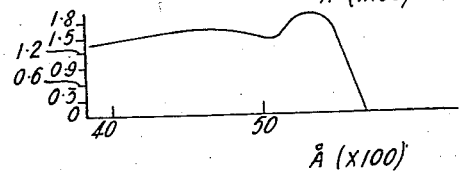

90 gms. of 2-methyl-5-phenylbenzoxazolium ethyl sulphate are dissolved by warming in a mixture of 12 ccs. of pure dry pyridine, 25 ccs. of acetic anhydride and 35 ccs. of pure dioxan. After standing several hours the solution is boiled gently under reflux for 2½ hours. It is then poured into 500 ccs. of ethanol and an equal volume of 20% aqueous ammonium thiocyanate is added. After standing several hours the liquors are decanted and the residue worked up with ether till granular. The resulting dark red powder is recrystallized from 400 ccs. of methylacetoacetate. A yield of 12 gms. of the sensitizer in the form of orange-red crystals is obtained. Optical characteristics: see Fig. 2.

*Example 3*

Figure 3:
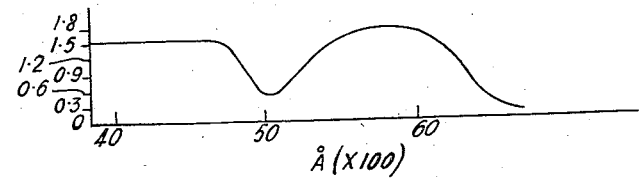

70 gms. of 2-methyl-β-naphthiazolium methyl sulphate are dissolved by warming in a mixture of 40 ccs. of dioxan, 25 ccs. of pure dry pyridine and 8 ccs. of acetic anhydride. The solution is boiled gently under reflux for 16 hours and then poured into 500 ccs. of ethanol. To the resulting ethanol solution 400 ccs of a 20% aqueous solution of sodium iodide are added with stirring. On standing, preferably overnight, green lustred crystals separate which are filtered off, washed with a mixture of alcohol and ether (1:2), and subsequently recrystallized from methanol containing 10% of its volume of 20% sodium iodide. A yield of 10.5 gms. of the sensitizer in the form of small lustred crystals is obtained. Optical characteristics: see Fig. 3.

*Example 4*

Figure 4:
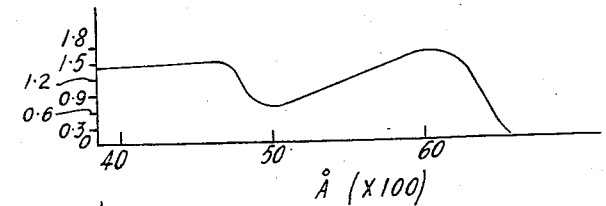

80 gms. of 2-methyl-4:5-diphenylthiazolium ethyl sulphate are dissolved by warming in a mixture of 60 ccs. of pure dioxane, 20 ccs. of pyridine and 10 ccs. of acetic anhydride. The solution is boiled gently under reflux for 24 hours. After pouring into 500 ccs. of ethanol, an equal volume of 20% aqueous sodium iodide is added with stirring. On standing, preferably overnight, a crystalline deposit is formed which is filtered off and washed with alcohol-ether (1:2). The dyestuff is recrystallized from ethanol to which 10% of its volume of 20% sodium iodide has been added. A yield of 12.5 gms. of a sensitizer in the form of dark violet crystals is obtained. Optical characteristics: see Fig. 4.

*Example 5*

Figure 5:
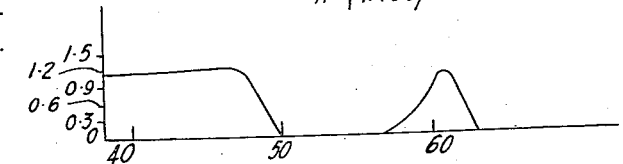

54 gms. of lepidine methyl sulphate is dissolved by warming in a mixture of 54 ccs. of pure dioxan, 15 ccs. of pyridine and 6 ccs. of acetic anhydride. The solution is then boiled gently under reflux for 20 hours. After pouring it into 400 ccs. of ethanol and adding an equal volume of 20% aqueous sodium iodide, a fine deposit is thrown out on standing for at least 12 hours. The crystals are separated by filtration and recrystallized from ethanol containing 20% of its volume of 20% aqueous sodium iodide. A small yield of a dyestuff forming a blue violet solution in alcohol is obtained. Optical characteristics: see Fig. 5.

*Example 6*

Figure 6:
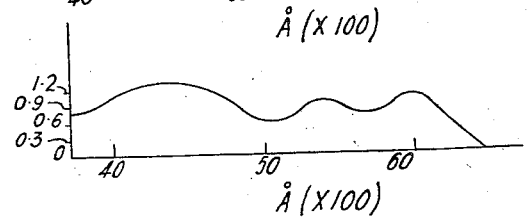

64 gms. of 2-methyl-benzselenazolium methyl sulphate are treated with a mixture of 20 ccs. of pure pyridine and 80 ccs. of pure dioxan. The mixture is boiled gently under reflux for 16 hours and then poured into 400 ccs. of ethanol. On adding an equal volume of 20% aqueous sodium bromide, precipitation occurs and the reaction mixture is left standing overnight. The deposit is treated first with alcohol-ether (1:2) and then washed with water. The crude product is recrystallized from methanol containing 10% of its volume of sodium iodide. A yield of 7–8 gms. of a sensitizer in the form of lustrous crystals is obtained. Optical characteristics: see Fig. 6.

I claim:

1. A process for the preparation of photographic sensitizers which comprises the step of reacting, in the presence of a dehydrating agent consisting of a liquid carboxylic acid anhydride otherwise inert in the reaction and an acid binding agent consisting of a tertiary organic base, a quaternized heterocyclic base having at least five and not more than six atoms in the ring of which at least one and not more than two are hetero atoms selected from the group consisting of nitrogen, oxygen, sulphur and selenium, at least one of said hetero atoms being nitrogen, and a methyl substituted methine group in one of the positions adjacent to and in the para position to the quaternized nitrogen atom of the base with a compound selected from the group consisting of dioxan and piperazine.

2. A process as claimed in claim 1 in which the condensation is carried out at the boiling point of the reaction mixture.

3. A process as claimed in claim 1 in which said heterocyclic base is quaternized 2:4:5 - trimethyl-benzoxazol.

4. A process as claimed in claim 1 in which said heterocyclic base is quaternized 2 - methyl - 5 - phenyl-benzoxazol.

5. A process as claimed in claim 1 in which said heterocyclic base is quaternized 2-methyl-β-naphthiazol.

6. A process as claimed in claim 1 in which said heterocyclic base is quaternized 2-methyl-4:5-diphenyl-thiazol.

7. A process as claimed in claim 1 in which said heterocyclic base is quaternized 2-methyl-benzselenazol.

8. A process as claimed in claim 1 in which said compound is dioxan.

References Cited in the file of this patent

UNITED STATES PATENTS 2,138,223   Wilmanns et al. -------- Nov. 29, 1938